United States Patent [19]
Robles Akesolo

[11] Patent Number: 6,081,043
[45] Date of Patent: Jun. 27, 2000

[54] EOLIAN ENERGY PRODUCTION SYSTEMS

[76] Inventor: Miguel Angel Robles Akesolo, Mijala de Losa, Mijala de Losa, Spain, ES-09511

[21] Appl. No.: 09/255,089

[22] Filed: Feb. 22, 1999

Related U.S. Application Data

[63] Continuation of application No. PCT/EP97/00212, Aug. 21, 1997.

[30] Foreign Application Priority Data

Aug. 21, 1997 [ES] Spain ................................. 97/00212

[51] Int. Cl.$^7$ ................................. F03D 9/00; H02P 9/04
[52] U.S. Cl. ................................. 290/55; 290/44; 290/53; 290/54
[58] Field of Search ................................. 290/52, 53, 54, 290/55

[56] References Cited

U.S. PATENT DOCUMENTS

| | | | |
|---|---|---|---|
| 4,242,050 | 12/1980 | Oakes | 290/55 |
| 4,299,537 | 11/1981 | Evans . | |
| 4,348,594 | 9/1982 | Lipfert | 290/54 |
| 4,470,563 | 9/1984 | Engelsman | 290/55 |
| 4,659,940 | 4/1987 | Shepard | 290/55 |
| 4,678,923 | 7/1987 | Trepanier | 290/55 |
| 4,878,807 | 11/1989 | Baker . | |
| 5,332,925 | 7/1994 | Thomas | 290/44 |
| 5,744,871 | 4/1998 | Akesolo | 290/55 |

FOREIGN PATENT DOCUMENTS

| | | |
|---|---|---|
| 403607 | 3/1932 | United Kingdom . |
| 2 131 491 | 6/1984 | United Kingdom . |
| 96/04479 | 2/1996 | WIPO . |

*Primary Examiner*—Elvin Enad
*Attorney, Agent, or Firm*—Helfgott & Karas, P.C.

[57] ABSTRACT

The invention is applicable to the type of eolian systems for energy production known as shifting wind motors, based on the arrangement of a series of blades (1) of optional profile, mounted on drag lines (2) forming a closed flexible belt, blades which are joined, across separators (6), to the corresponding drag lines (2), it being possible to vary the angle of attack of each blade by means of relative displacement of the mentioned drag lines (2) with respect to the so-called ruling cables (8). In a variation of the embodiment the blades are joined to an orientation axis (25) over which they rotate freely, to spontaneous adopt the ideal angle of attack, achieving maximum power control by displacement of the blades (1) with respect to the lines (2) overcoming the resistance offered by a spring or tared elastic component. The flexible belt is moved over pulleys (4') consisting of hoops (3) which are preferably arranged coaxially with respect to the columns (3) supporting the structure.

11 Claims, 11 Drawing Sheets

EOLIAN ENERGY PRODUCTION SYSTEMS

This is a continuation of application Ser. No. PCT/EP97/00212 filed on Aug. 21, 1997.

OBJECT OF THE INVENTION

The present invention refers to a system for producing eolian energy energy, more specifically in eolian installations of the type known as shifting wind motors, consisting of a series of blades with a suitable profile fixed to a closed and flexible belt, consisting of cables which move horizontally between at least two columns, such that the impact of the wind on the blades involves them being pushed and consequently the dragging of the flexible belt, said movements being applied to the production of electric energy.

The object of the invention is to obtain an eolian system in which each one of the blades may vary its orientation with respect to the transmission belt, and consequently, with respect to the wind, allowing the system to operate at a fixed speed, independent from wind speed.

Another object of the invention is to allow the system to start by itself easily and that the blades may be flagged to support considerably strong winds.

And yet another object of the invention, according to a variation of the embodiment, is to obtain an eolian system in which the blades spontaneously adopt, according to wind strength and direction, the ideal angle of attack, the system operating together with angle of attack limiting devices, so that when the wind exceeds the values pre-established as maximums in the installation design, the angle of attack of the blades is self-adjusted, presenting less resistance to the wind and hence safety in the installation.

The result sought by the system in the invention is to increase the performance of the shifting wind motor, extend material life, increase machine reliability, reduce installation costs and widen the operation speed range.

BACKGROUND OF THE INVENTION

Different types of eolian systems are known which are based on the strength of the wind applied to blades vertically mounted over a flexible and closed transmission belt running between columns, by means of their corresponding pulleys, such that the strength of the wind impinging on the blades involves them being pushed and, as a result, the dragging of the transmission belt, to be able to apply the kinetic energy created by the movement to the pumping of water or air, the driving of mills or other machines or to supply alternators to produce electric energy.

A system of this type is that claimed in the Spanish patent No. 9401773, of the same applicant, which is based on a series of blades having a bi-convex profile, which are transversely joined, across some distancing components, to a flexible transmission belt, specifically consisting of two or more cables in a horizontal arrangement and at different heights, cables which run over pulleys, in turn arranged in a series of columns or towers, pulleys which are assembled on alternator shafts, such that movement in the closed circuit of the transmission belt formed by the cables is converted into a rotational movement by the pulleys and hence in a movement of the alternator shaft to produce electric energy.

These types of systems are or a fixed pitch, that is, the relative position between the cables of the transmission belt and the blade profile axis remains constant such that the wind impact angle at the blade depends on the ratio of blade and wind speeds, it being necessary to use mechanisms which vary the speed of the blades to select an impact angle and hence be able to adjust the wind motor power. On the other hand, the wind impact angle over the blade profile when the turbine is idle is inadequate for motor effects to be produced on them and, therefore, the system cannot start by itself. Finally, when extremely strong winds or gales blow, the blades are subjected to very large stresses, it being possible, on certain occasions, that they suffer considerable damage or complete destruction.

Another system with same characteristics is that described in Patent GS-A-403 607, which discloses the possibility of changing the position of the blades with the assistance of a regulator associated to one of the two shafts and to an auxiliary chain which brings about a change in the leading angle of all the blades with the assistance of short rods.

Although this system entails in itself a remarkable advancement in optimising performance, it is however more complex and furthermore provides a mayor drawback or disadvantage in that the change in the leading angle of the blades is the same for all of them.

DESCRIPTION OF THE INVENTION

The improvements, purpose of this invention, applicable to the type of eolian system for energy production referred to in the previous section, are based on varying the blade pitch, i.e., to modify in a controlled manner the angle which the blade presents to the wind, hence allowing a speed of fixed design in the cables to be chosen, For this purpose, mechanisms have been foreseen which permit variation of the angle between the blade and the cables comprising the transmission belt.

The variation in blade pitch or angle, is obtained by longitudinally or transversely displacing one or several of the transmission belt cables, hereinafter called ruling cables, with respect to the remaining cables or drag lines, joining the ruling cables to the blade, delayed with respect to the drag lines, according to the direction of movement, such that the displacement of the ruling cables with respect to the drag lines provokes the rotation of the blade over the unions of the former to the drag lines.

If the blade pitch is varied by means of longitudinal displacement of the ruling cable, the drag lines are joined to the front part or attack edge of the blade by respective separating arms, articulated in the anion to the blade or to the cable, while the ruling cables are joined to the blade exit edge by means of a mechanism consisting of a separating arm, fixed to the cable and a distancing rod, articulated between the arm and the blade, proceeding to the braking of the ruling cables provoking a relative longitudinal displacement with respect to the drag lines and, as a result, pull the blade tail. This movement produces rotation of the blade with respect to its points of union to the drag lines and, hence, a change of blade orientation with respect to the transmission belt and the wind.

The distancing rod may be a hydraulic or pneumatic spring whose spindle is articulated to the blade tail and whose cylinder is joined to the separator arm fixed to the ruling cable, to dampen the tugging produced by the system fundamentally when the blades change direction over the pulleys.

The braking of the ruling cable may be produced by means of any system known, for example, by incorporating on the exit axis of the pulley associated to this cable, a generating component which absorbs, in a controlled manner, more or less energy and therefore braking the cable movement accordingly. Evidently, any other type of braking system known may be used.

The relative transverse displacement between the ruling cables and the drag lines is produced on a horizontal plane and in the direction of the prevailing winds, for which purpose all the cables of the flexible transmission belt are joined to the blades by means of articulated separator arms and a horizontal displacement of the pulleys over which the ruling cables run is provoked. Obviously, this displacement causes the separator arm associated to the ruling cable to be pushed with respect to the drag separator arm and as a result, blade rotation. Depending on the greater or lesser displacement of the pulleys and the direction of the displacement, the angle formed by the blade may be varied at will.

Likewise, blade ruling may be performed by means of combining braking of the ruling cables and displacement of the ruling cable pulleys on their own horizontal plane.

In this way, by controlling the displacement of the ruling cables, it is possible to vary in a controlled manner, the angle formed by the blade and the transmission belt and, as a result, the wind impact angle over the blades, it being possible to chose the push of the latter over the cable. Also, a safety position of the system may be adopted when the wind speed is extremely high, such that the blades remain flagged with respect to the wind. Likewise, it is possible to orientate the blades such that the wind impact angle over the profile is adequate to produce motor effects with the turbine stopped and the system may start by itself.

That is, the angle of attack of the blades, as indicated above, is sought in each moment by a ruling or control center of the installation, according to the characteristics of the existing wind, being simultaneously modified for all the blades, such that all of them are obliged to adopt the angle of attack determined by the ruling center, without taking into account that the wind received by each blade is different, since, evidently the overlapping and superposition of the eolian influence zone for each blade acts over the rest, such that the blades working upstream do not perceive the wind in the same way as the blades working downstream, and neither do two consecutive blades perceive the same type of wind.

Now then, in one variation of the embodiment, the shifting wind motor is made to work with a constant angle of attack, without centralized automatic control systems, such that each blade independently and spontaneously adopts, for any wind speed and direction, without any external control thereof, the angle of attack producing the greatest push in the longitudinal direction of the cables and, hence, to extract from the wind, at any given time, the maximum power possible. This permits greater reliability, cost reduction, improvement of aerodynamic performance and spontaneous starting of the system.

That is, with winds below the nominal power, the angle of attack for the blades is always that of maximum performance and this angle of attack is acquired by the blades individually and spontaneously due to the way in which the blade is fastened to the cable.

In the case of winds above the nominal power, each blade, individually, pushed by the wind, advances by exceeding the force of a pre-stressed spring, a movement which terminates in a sliding stop which generates a turning moment in the blade proportional to the wind. This moment enters in the sum of the moments which maintained the previous angle of attack, the equilibrium of opposed moments being in another angle of attack, an angle which decreases with increasing wind speeds. The result is that the force couple in the cables is maintained at a fixed value.

In this way, for winds below those of nominal power, control of performance is executed by each blade individually and spontaneously and this performance is determined by blade construction. When the wind exceeds the nominal speed, power control is possible by adjusting blade speed, because, in these winds, the blades give a constant couple, as already explained above and according to the equation "power=force×velocity" and as the force couple in the cable is the sum of pushing of the blades, which is constant, and the speed is limited by the generator or load, the power is also limited.

The spontaneous angle of attack according to the invention is obtained by enabling the blade to rotate freely, like a vane, over a point or axis that runs parallel to the span, specifically chosen so that the blade adopts an orientation deviated several degrees with respect to the relative wind it perceives At the height of each cable the blade has a fastener which fixes it to the cable across its orientation and turning axis. Depending on average wind speed and the power or size of the shifting wind motor, the blade profile is defined, which may be symmetrical or of symmetrical action, convex or convexo-concave, asymmetrical or deformable symmetrical of canvas and other materials. Once the profile has been selected, the rope and the plan are defined to then search for the angle of attack giving us the maximum force over the cable and the fastening point whose moment is zero for this angle of attack, such that we have the blade with its orientation axis.

All wind motors, but especially those of a large size, need some type of maximum power control, since if this were not the case even the smaller ones, to be able to capture the fastest winds without failures, would have to be unacceptably oversized for their economic performance. Each time the wind doubles its speed, the power increases eight-fold and nevertheless, there are many hours per year of slow and moderate winds and very few hours of strong winds. Therefore, it is imperative to search for the balance between structure, investment and energy captured, since, definitively, the greatest amount of energy should be captured with a minimum investment.

According to the invention, the limitation of maximum power is given by a mechanism which joins the blade orientation axis and the cable. This mechanism allows the blade to move with respect to the cable in the longitudinal direction of the latter when the wind exceeds the maximum direction of the latter when the wind exceeds the maximum design power. The forward movement of the blade is limited by the force of a spring or pre-stressed spring, with a force which is the maximum given by the blade, such that when the blade pushes the cable with a force greater than the prestressed force of the spring, the latter retires compressing and permitting the blade to move forwards. The forward movement of the blade makes a lever which is interlocked with the orientation axis and, hence, the blade, to contact with an inclined partition interlocked with the cable, obliging the blade to adopt an angle of attack which decreases as the advance increases or, in other words, the greater the force received from the wind, thus achieving a balance between spring compression and the blade angle of attack, which stabilizes the force produced by the blade on the flexible belt.

The other improvement contributed by the invention concerns the pulleys which, according to the invention, consist of a hoop which rotates around one or several wheels which confine it. The axes of these wheels are fixed to the columns supporting the assembly across corresponding radial arms. The axes of the wheels supporting and guiding the hoop may be shafts of electric generators (alternators) or of mechanical transmission. In turn, externally, the hoop has a throat or channel suitable to guide the corresponding cable and inside a rolling track suitable for the guidance and transmission of mechanical energy to the guide wheels with minimum friction losses and noise. The structure of the hoop and wheels should be sized to support, with minimum deformation and without fatigue, the cable tension, the centrifugal force and its own weight.

DESCRIPTION OF THE DRAWINGS

To complement the description being made and to contribute to a greater understanding of the characteristics of the invention, this descriptive report is accompanied by a set of drawings, as an integral part thereof, which are to illustrate and not to limit the invention, where the following figures are shown.

PREFERRED EMBODIMENT OF THE INVENTION

In view of the commented figures and according to an embodiment in which the transmission belt consists of three cables, it may be observed how the eolian system of the engine comprises a plurality of blades (1) arranged vertically and fastened through their internal face to a pair of drag lines (2), which run along a closed line between two columns or towers (3) arranged opposite to each other, with the particularity that these drag lines (2) determining the transmission belt pass across the corresponding pulleys (4) fitted on arms (5) which act as separators.

Figure 1:
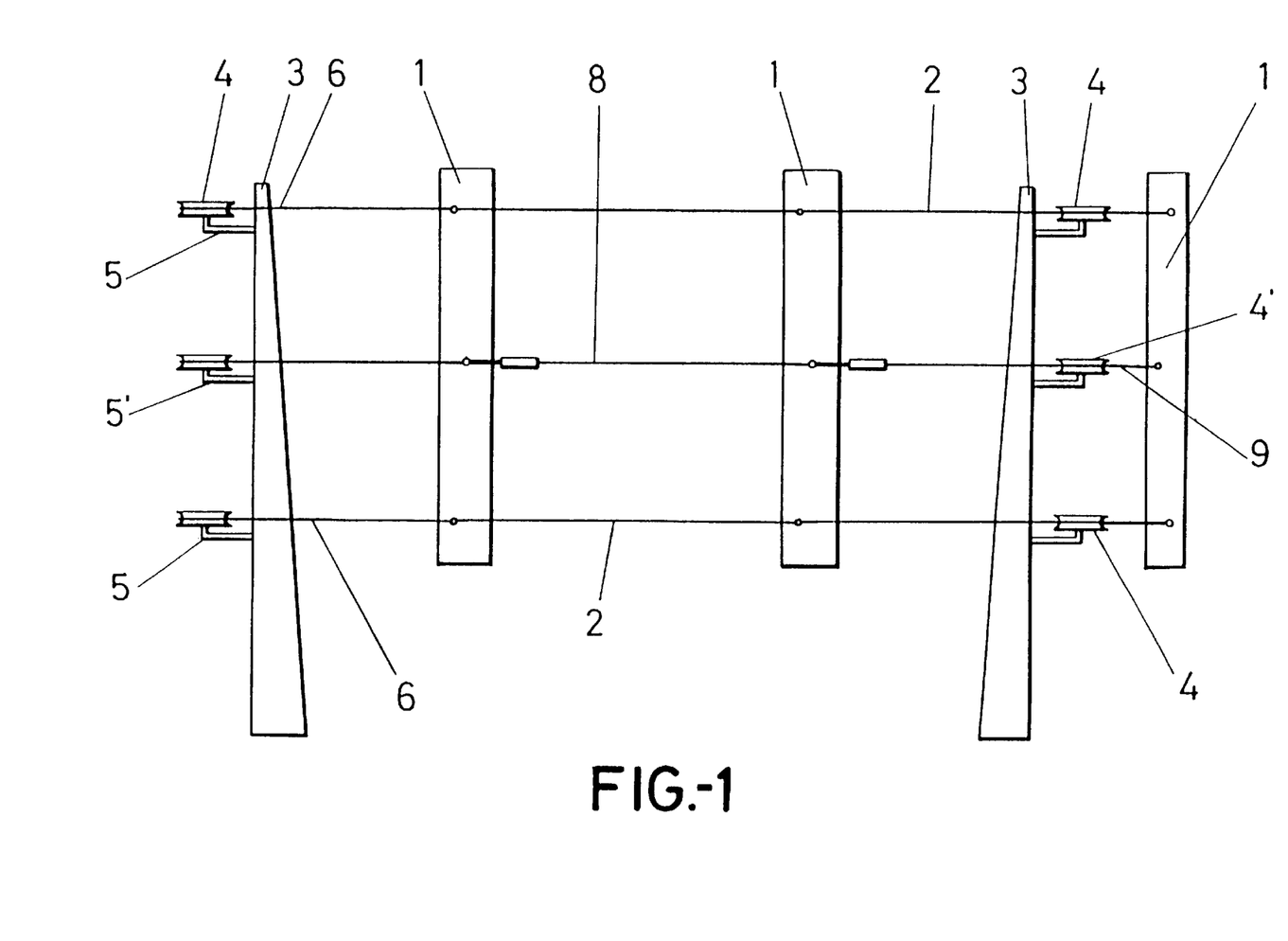
FIG. 1—This shows a schematic view according to a side elevation of the system of the invention, according to a transmission belt formed by three cables, showing the two drag lines and the ruling cable joined to the blades according to a first embodiment in which the ruling cable may be displaced longitudinally with respect to the drag lines.
Figure 3:
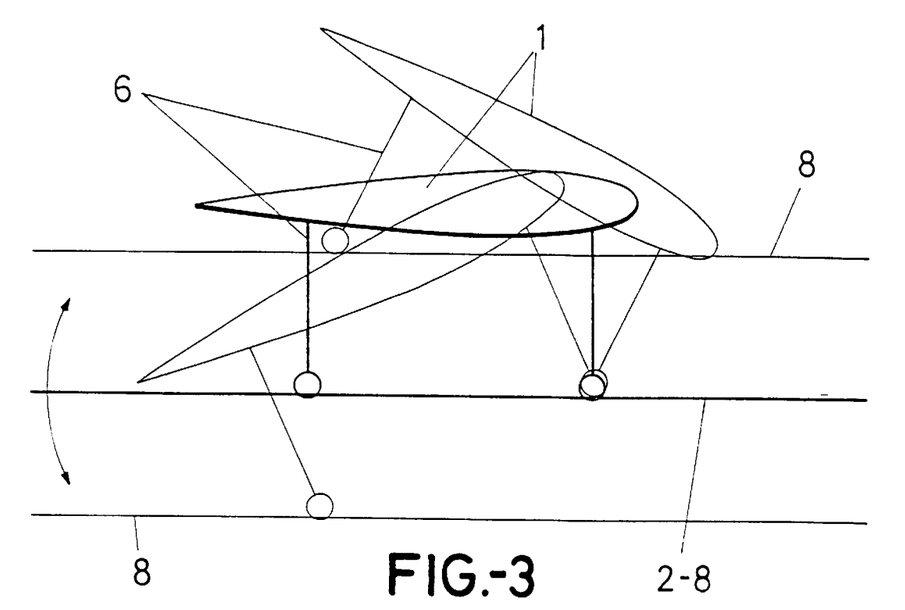
FIG. 3—This shows, schematically, the mechanism based on which the longitudinal displacement of the ruling cable is converted to a variation of the angle of attack of the blades with respect to the direction of the wind, when the separator arms are joined in a fixed manner to the blade and articulated to the cable.
Figure 4:
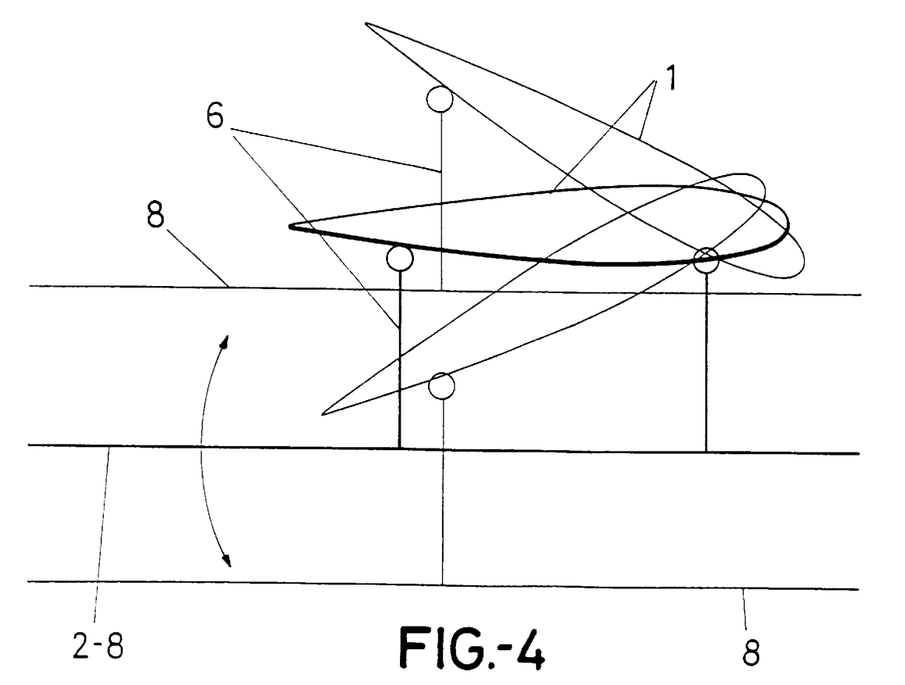
FIG. 4—This shows, schematically, the mechanism based on which the longitudinal displacement of the ruling cable is converted into a variation of the angle of attack of the blades with respect to wind direction, in the case in which the separator arms are articulated to the blade and fixed to the cable.
Figure 5:
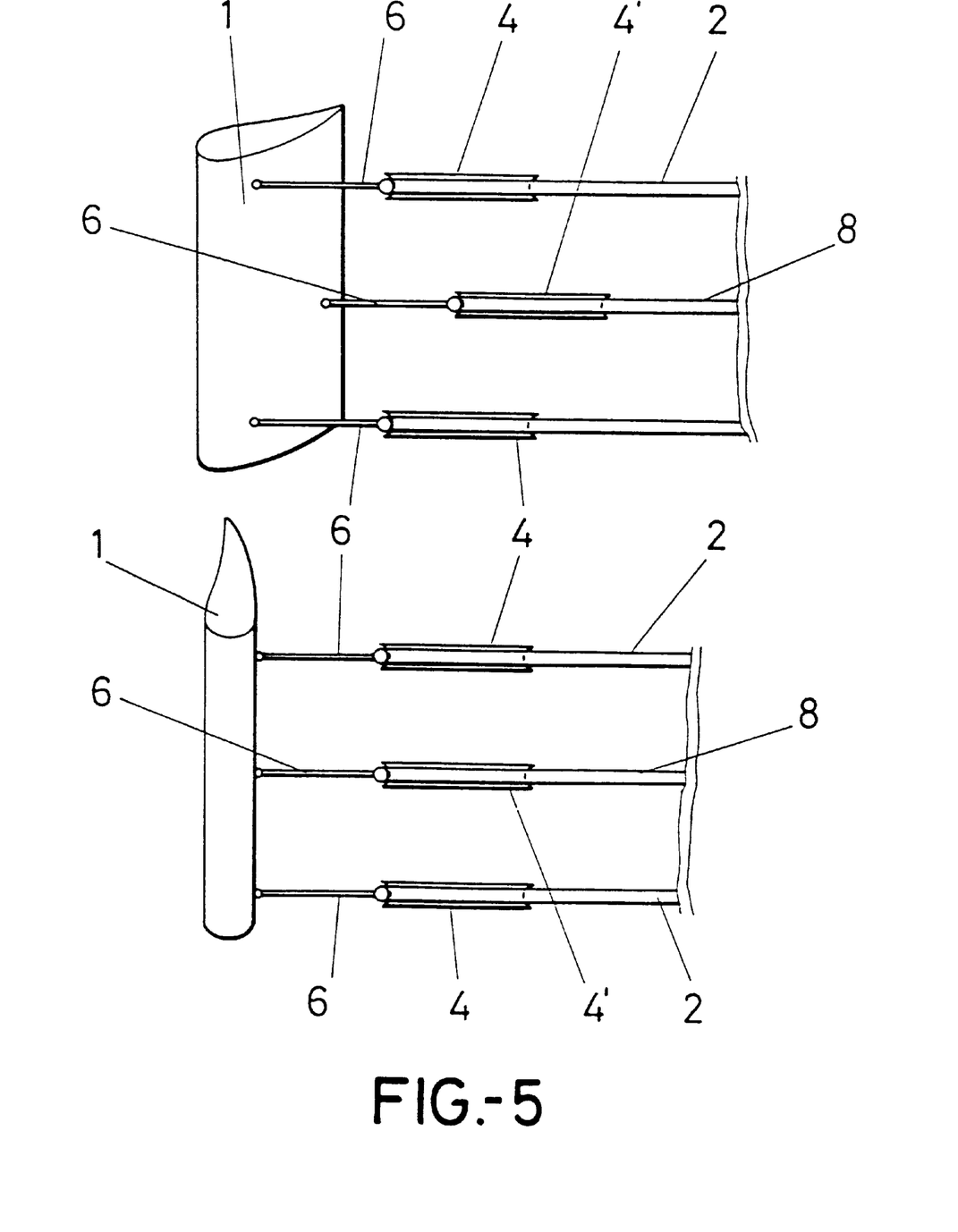
FIG. 5—This shows a schematic view according to a side elevation of the system of the invention, according to a transmission belt consisting of three cables, showing a blade and the means of union of the latter with the two drag lines and the ruling cable, as well as the positions the pulley may occupy, which supports the ruling cable according to an embodiment in which said ruling cable may be displaced by the movement of the pulleys in a horizontal plane and the direction of the prevailing winds.
Figure 6:
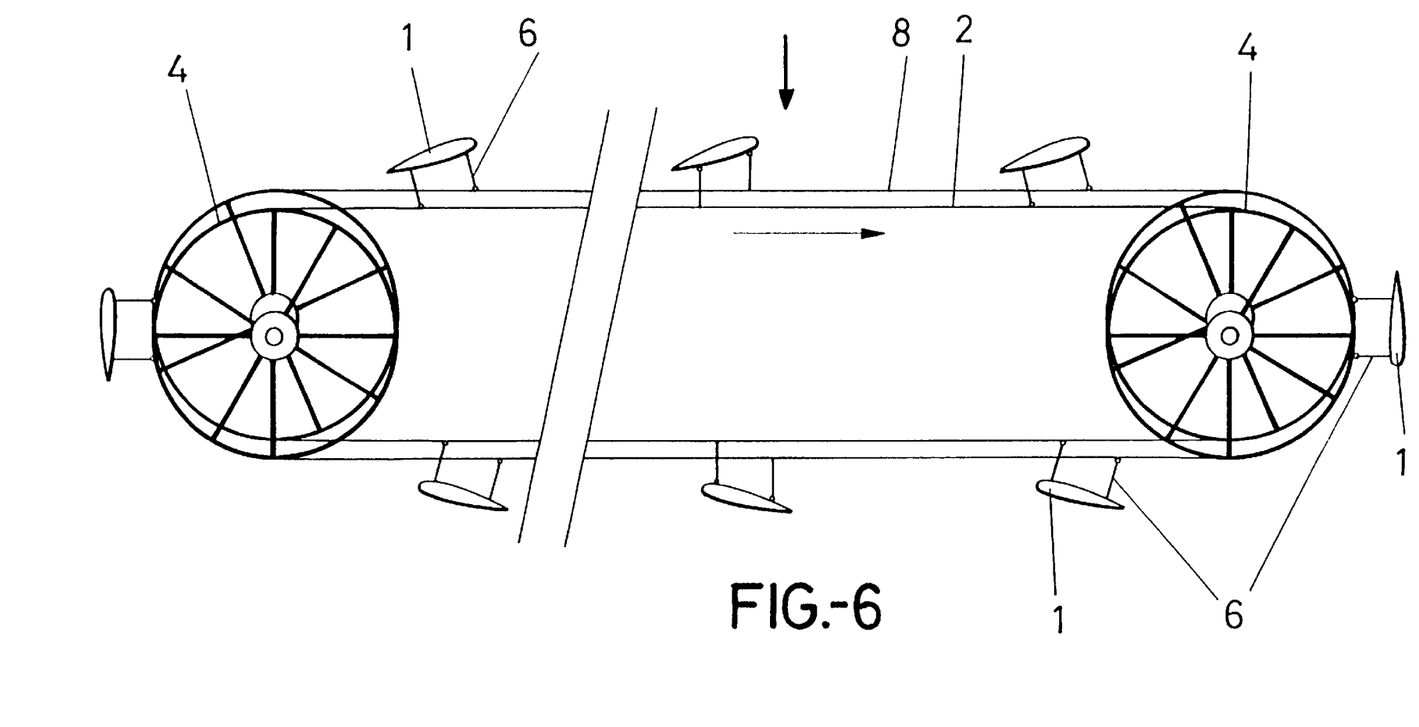
FIG. 6—This shows a plan view of the system of the invention, according to a transmission belt consisting of three cables, according to an embodiment in which the ruling cable may be displaced by movement of the pulleys in a horizontal plane and in the direction of the prevailing winds.

In the details of FIG. 1 and extended in FIG. 3, the bi-convex profile of the blades (1) is shown, such that their fastening to the cables (2) is made at their internal face, near to the attack edge or the end of greatest thickness, making the link of each cable (2) to the blade (1) by means of the corresponding separator arms (6), either joining in a fixed manner to the cables (2) and articulated to the blades (1), or in an articulated manner to the cables (2) and fixed to the blades (1). When wind speeds are low, blades of a deformable profile may be used and even those of a curved profile.

Complimentarily, according to a first embodiment, the system incorporates an intermediate cable (8), called a ruling cable, to which the blades (1) are joined by their tail or exit edge by means of a mechanism constituted as from a separator arm (9) whose free end counts with a joint (10) on which a tubular component (11) is arranged internally to which a rod (12) may be displaced which, at its other end and across the joint (13), is linked to the exit edge or tail of the blade itself (1). According to this embodiment, when the ruling cable (8) is slowed down with respect to the drag lines (2), the tail of the blade (1) is pushed by the rod (12) which causes said blade (1) to rotate and as a consequence a variation in the angle formed between the latter and the transmission belt is produced.

The ruling cable (8), intermediate between the lines (2) of the flexible transmission belt, also runs between the corresponding pulley (4') fitted over the columns (3), with the corresponding distances (5').

Finally, it should be said that the rod (12), having both an axial and an angular movement, has an elastic component (14) associated to a final run stop (15), which dampens the longitudinal displacements of the rod (12), eliminating the sudden tugs produced on changing the direction of the blades (1). This effect may be obtained more easily when the rod (12) is constituted by the spindle of a spring, hydraulic or pneumatic, joining the mentioned spindle in an articulated way to the tail of the blade (1), while the cylinder of the dampener is joined, also in an articulated manner to the separator arm (9) fixed to the ruling cable (8).

According to another embodiment, the relative displacement between the ruling cable (8) and the drag lines (2) is achieved by displacing the pulley (4') over which the ruling cable (8) runs in a horizontal plane and according to the direction of the prevailing winds. In this embodiment, the ruling cable (8) is joined to the blades (1), by their tail or exit edge, by means of separators (6) similar to those used for the union of the drag lines (2) to the blade (1) attack heads or edge, such that the horizontal displacement of the pulleys (4') through which the ruling cable (8) runs provokes a pushing of the separator arm (6), associated to the ruling cable (8), over the blade (1) and, as a result, a rotation of the latter with respect to the separator arms (6) associated to the drag lines (2). Depending on the greater or lesser displacement of the pulleys (4') and the direction in which the displacement is made, the angle formed by the blade (1) may be varied at will.

By means of the system, constituted as above, and on the basis of a relative displacement of the ruling cable (8) with respect to the drag lines (2), the blades (1) may be suitably orientated to obtain the maximum performance when the wind is advantageous, it also being able to adopt a safety position when the wind strength is extremely high and may damage the system if it directly impinged on the blade (1) surface.

Figure 7:
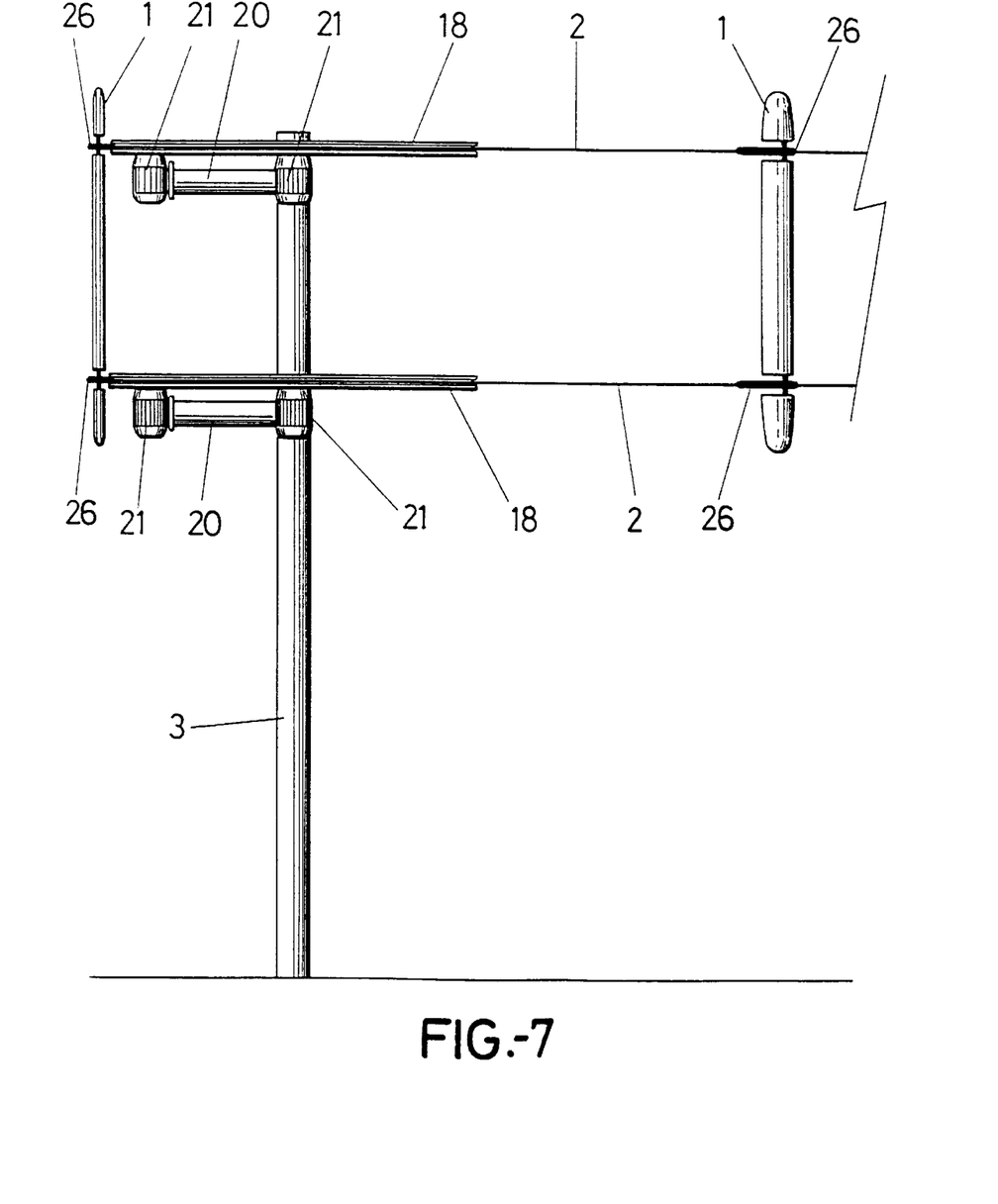
FIG. 7—This shows a schematic view according to a representation in side view of one part of the system realized according to a different embodiment, where one column of the various possibilities appears that may be included in the eolian system, on whose column are fitted two hoops guided on the corresponding pulleys and over said hoops the corresponding drag lines carrying the blades with the support and orientation system realized according to this second form of embodiment.
Figure 8:
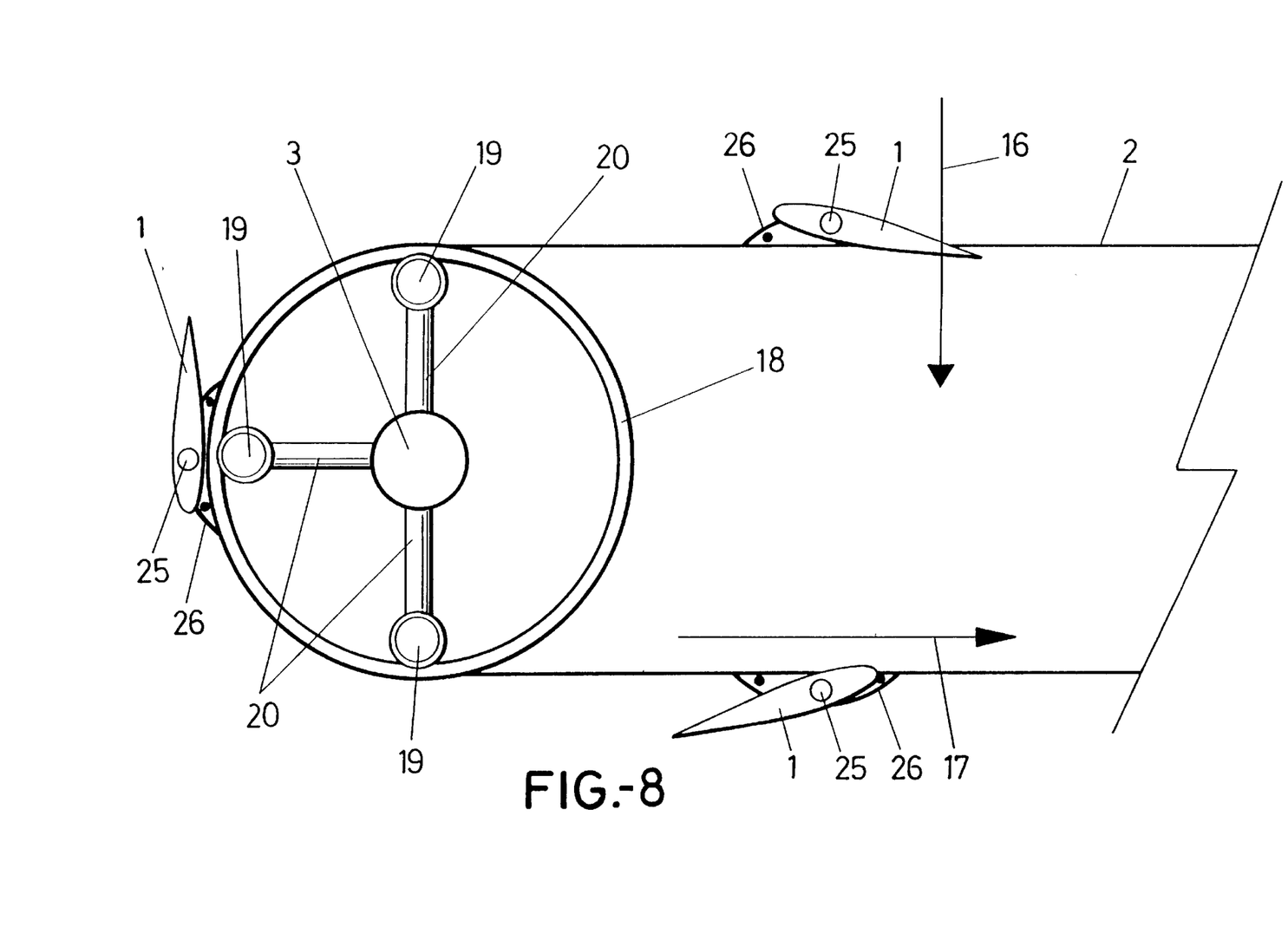
FIG. 8—This shows a schematic plan view of the part of the system or installation represented in the previous figure.
Figure 9:
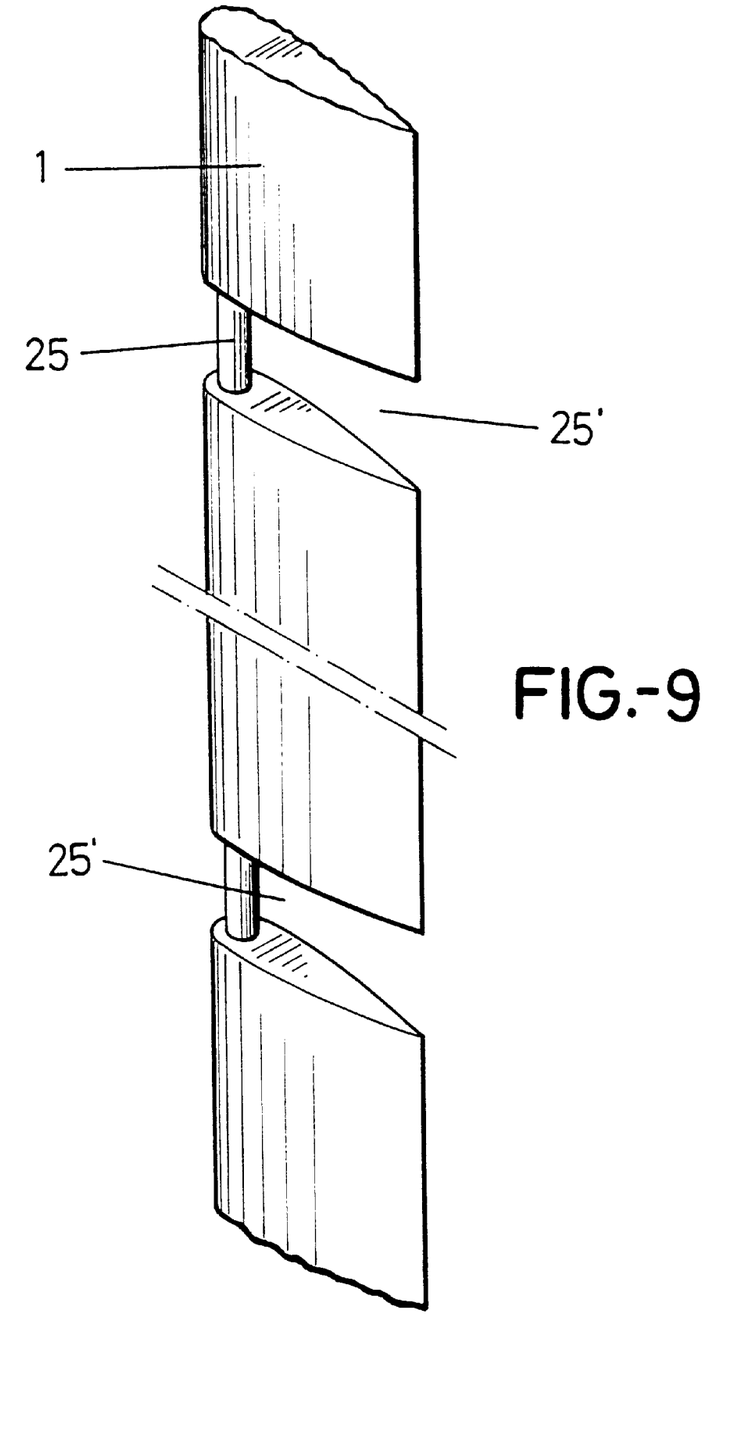
FIG. 9—This shows a detail of what could be considered a perspective of a blade with the corresponding orientation and support axis to the cables.

In a variation of the embodiment, that shown in FIGS. 7 to 13, it may be observed how the eolian system or shifting wind motor includes several blades (1) fixed over the drag lines (2), which constitute the flexible belt, the wind direction being observed in FIG. 8 according to the arrow (16) and the direction of line (2) movement according to the arrow (17).

The lines (2) run through hoops (18), which are preferably fitted coaxially to the corresponding support columns (3), such that said hoops (18) are guided on wheels (19) arranged internally and foreseen at the ends of the corresponding radial arms (20) protruding from the support column (3). As may be observed in FIG. 7, alternators (21) have been foreseen on the wheel axes (19).

In a preferred embodiment, the hoops (18) will have a rim (22), finished in a rolling extension (23) which contacts with the wheel (19) Obviously, the hoop or hoops (18) will have a throat for cable guidance (2).

As indicated above, depending on the average speed of the prevailing winds and the power and size of the wind motor, the blade profile is defined, and they may be symmetrical or of symmetric action, convex or convexo-concave or others. Once the blade profile has been selected, the rope and plan thereof are defined, to then determine on a testing bench the angle of attack which gives us the maximum force over the cable and the fixing point whose moment is zero for said angle of attack, hence defining the blade and its orientation axis.

Figure 2:
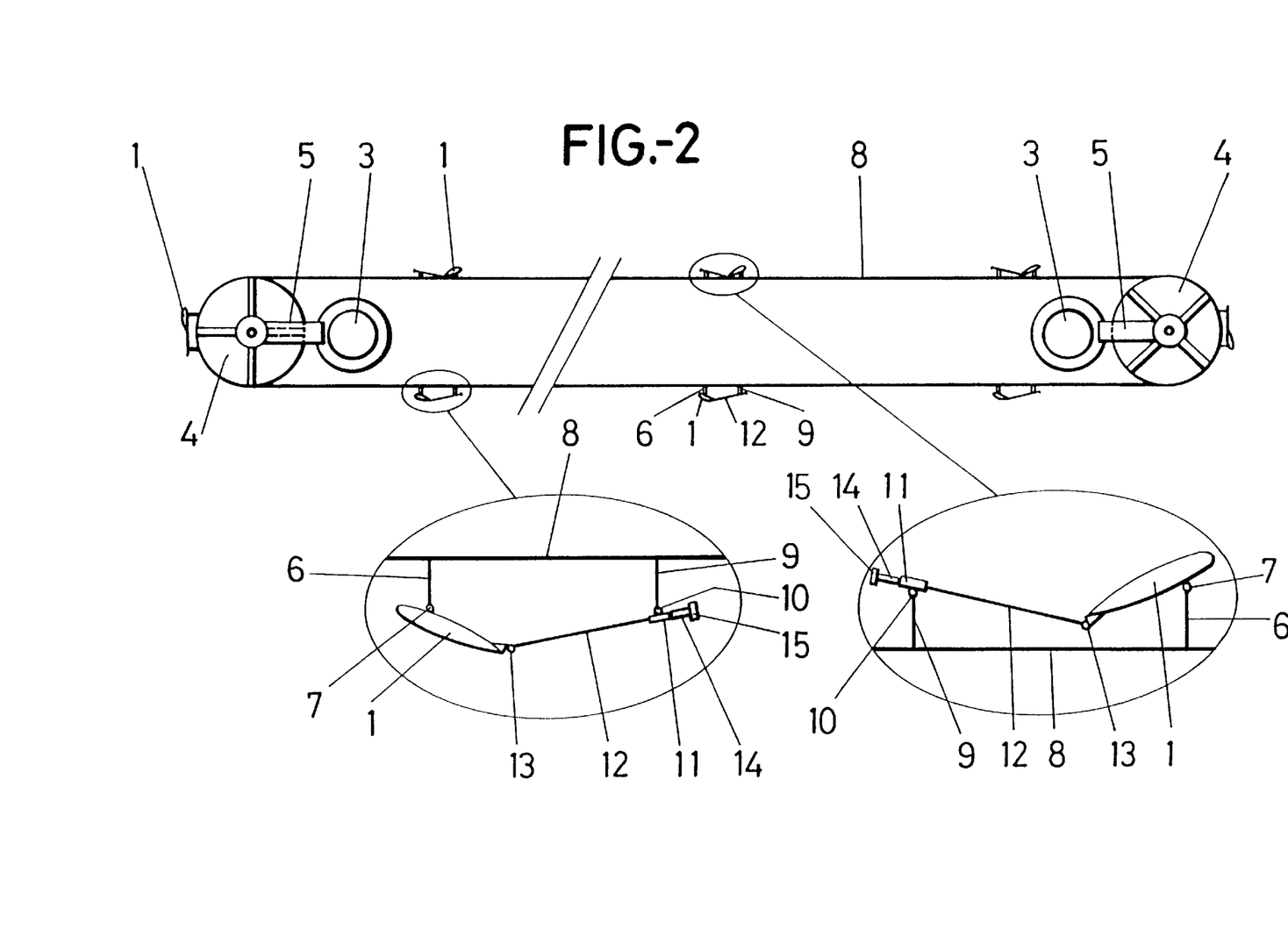
FIG. 2—This shows a schematic plan view of the same system shown in the previous figure.

The union of each blade (1) to the lines (2) comprising the flexible belt, is made across their orientation axis (25) and for this reason, as illustrated in FIGS. 2 and 3, the blade will have notches (25'), cuts and other means permitting access to the axis from the union devices to the lines (2) Each blade (1) may freely rotate over its orientation axis (25).

According to the blade design selected, its orientation axis may be external or internal, that is, it may be in the inside or outside.

Likewise, the orientation axis (25) may be continuous or discontinuous, being physically or imaginatively extended along and parallel to the blade span.

As has been previously indicated, the repeated orientation axis (25), continuous or discontinuous, is foreseen so that the blade may rotate freely with respect to the latter and, in turn, to join the blade to the drag lines by means of the support parts (26), which, first of all have some clamps (27) across which the assembly remains fastened to the cable. Besides the clamps (27), at least one of the support parts (26) is equipped with the maximum power control mechanism, consisting of a sliding part (28) to which the orientation axis is fitted (25). Said sliding part (28) may be displaced in a guide (29) statically fixed to the support (26) to which, as has been previously mentioned, across respective clamps (27) the corresponding drag line (2) is joined. The displacement of the sliding part (28) is exerted against the force of a spring (30), which is tared according to the maximum safety force the blade should supply to the cable.

As a result of the above, when the wind strength and hence the force supplied by the blade exceeds the spring tare (30), the sliding part (28) moves forward dragging the blade (1) with the support axis (25), until the lever (31), interlocked with the axis (25), comes into contact with the partition wall (32), made in the direction of the lever, such that the displacement of the latter over the partition wall (32) causes the blade (1) to drift or, in other words, the proportional decrease of the angle of attack, that is, adopting an angle of attack, which will be less as the force applied by the blade against the spring (30) increases, there being a balance between spring compression and angle of attack of the blade, hence maintaining the force the latter provides the cable stable.

The maximum power control device described, should exist at least in one of the support parts (26) of the union to the cables, depending on the existence of one or more parts with this device, the length or span of the blades. The remaining union devices of the blade to the respective cable across their orientation axis are not necessary to understand the maximum power control device, it being possible for them to be simple means of union of the cable to the orientation axis.

Figure 10:
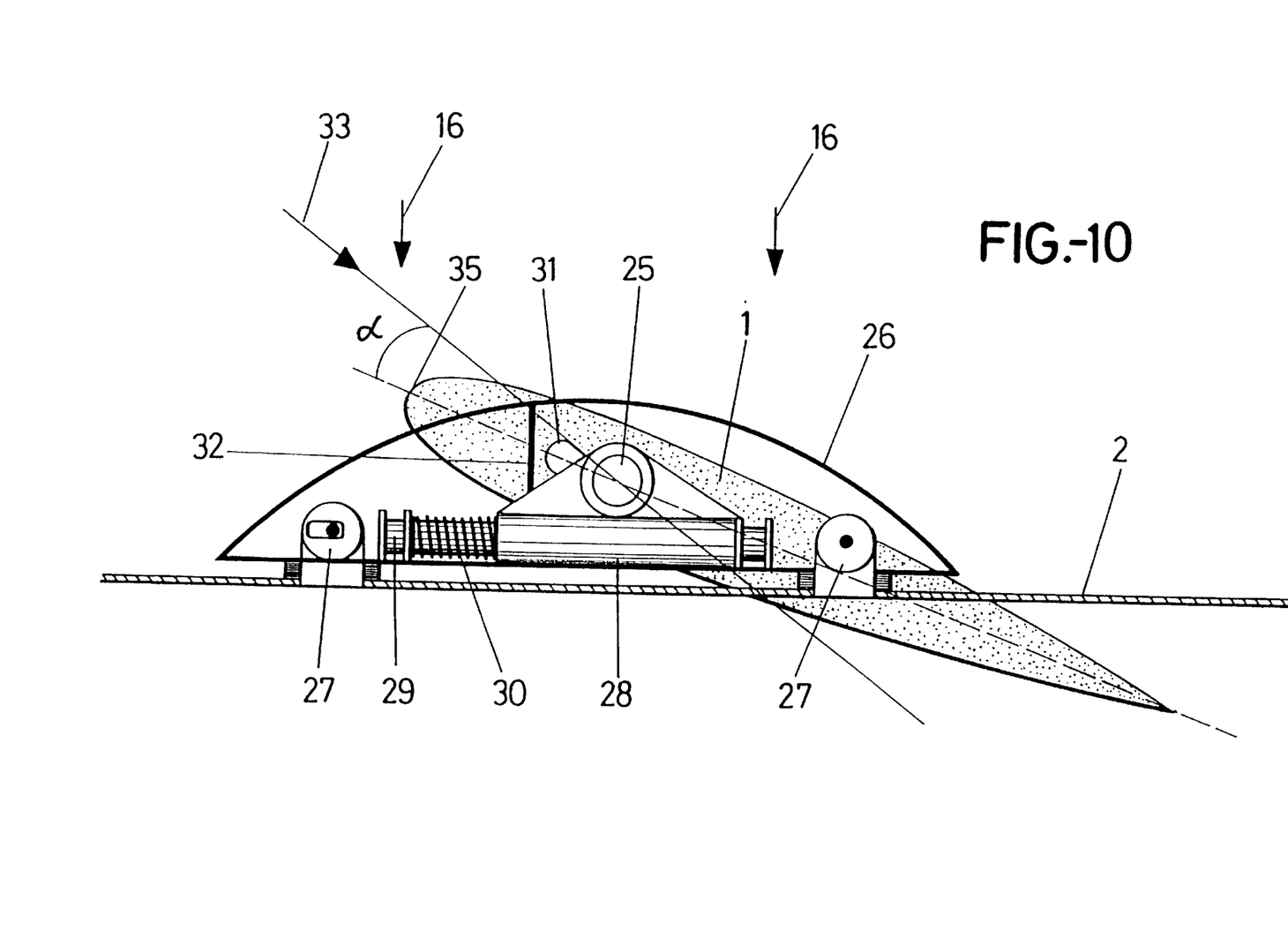
FIG. 10—This shows a detailed view corresponding to the blade union support, across its orientation axis, to the cable, which support integrates the mechanism allowing self-orientation of the blade, in order to adopt an angle of attack smaller than the spontaneous angle when the wind speed exceeds the safety limit established for the installation.
Figure 11:
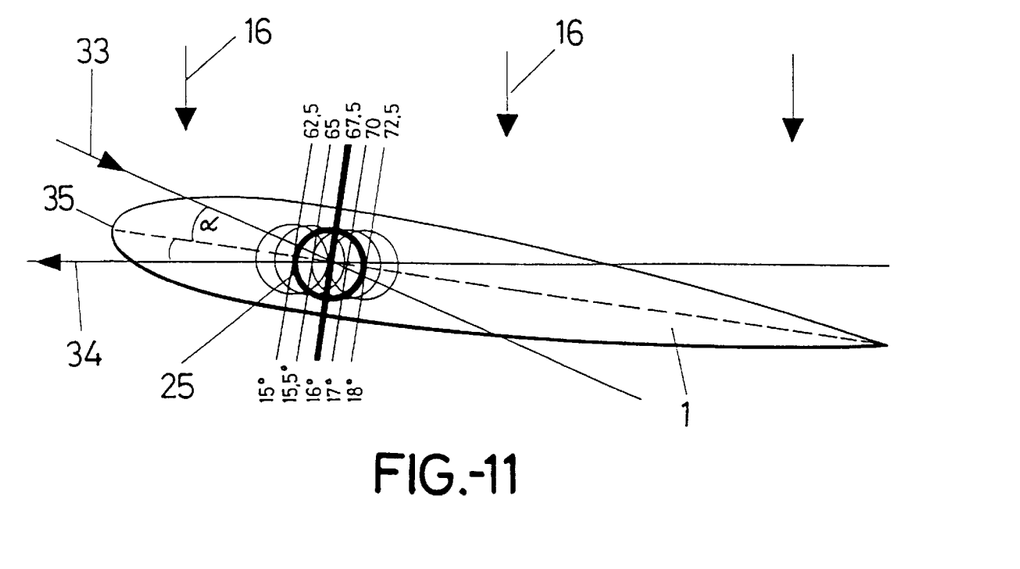
FIG. 11—This shows a section view of the blade, to illustrate on the same, different positions of the support axis, each one of which will result in a spontaneous angle of attack, all according to the embodiment shown in FIGS. 7 to 10.

Obviously, in the design of the wind motor the spontaneous angle of attack referred to by ( ) will be adjusted, as shown in FIG. 10 and more specifically in FIG. 11, such that when taking into account that this spontaneous angle of attack is the angle formed by the relative wind direction, corresponding to the arrow (33) and the axis of the blade (1) itself, the relative wind being the result between the real wind component (16) and the driving power referred by (34) in FIG. 11. It may be verified how this spontaneous angle of attack ( ) varies according to the position of the axis (25) with respect to the attack edge (35) of the blade (1) In FIG. 11 the variations of the mentioned angle ( ) are seen or that of spontaneous attack, as well as the variation of the distance between the assembly axis (25) and the attack edge (35) of the blade (1).

Figure 12:
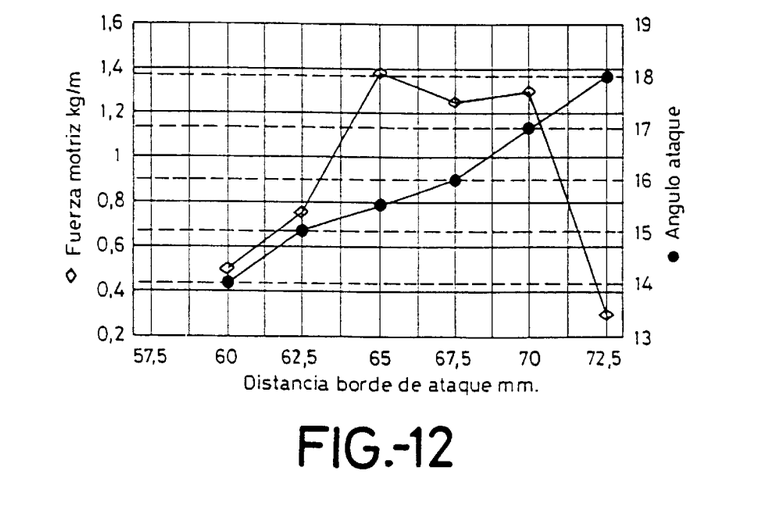
FIG. 12—This shows the graph in which the relation existing between the angle of attack, the orientation axis distance from the attack edge of the blade and the driving force provided by the blade are shown.
Figure 13:
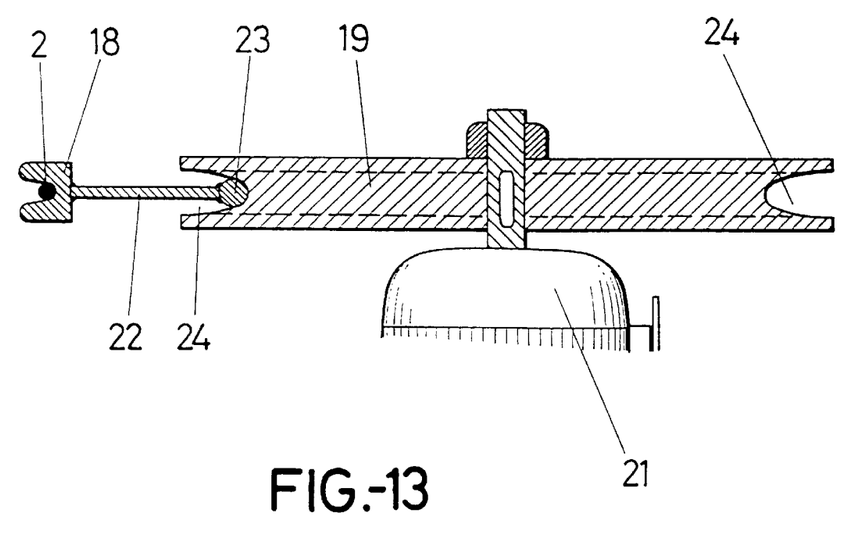
FIG. 13—This shows, finally, a detail of the hoop guide through which the drag line runs, which hoop is guided in one or more internal wheels whose axis, in this case, corresponds to that of an alternator.

In FIG. 12, a diagram is shown where the interrelation existing between the axis position (25), namely, its situation with respect to the attack edge (35) of the blade, the spontaneous angle of attack ( ) and the driving power supplied in each case, may be observed. This diagram corresponds to a NACA 63-015 profile, with a rope of 250 mm and for a relative speed of 22.2 m/s.

What is claimed is:

1. An eolian systems for energy production of the type consisting of several blades (1) mounted in a vertical position to a flexible, closed transmission belt consisting of a support structure based on towers or columns (3) defining the geometry of the transmission belt, whose towers or columns (3) support pulleys (4 or 19) over which run cables to which the blades (1) are fixed, being characterized in that they include a mechanism permitting the controlled variation of the angle between the blades (1) and the transmission belt to obtain the maximum performance when the wind is advantageous, such that each blade (1) is joined by its head or attack edge to the so-called drag lines (2), across separators (6) consisting of rods articulated to the blade (1) or the line (2), such that, at its tail or exit edge, the blades (1) are joined to ruling cables (8), such that the latter may be displaced longitudinally by the pulleys (4') braking supporting them, or transversely by displacement of the mentioned pulleys (4') in a horizontal plane and, as a result, vary the blade (1) angle with respect to the wind.

2. An eolian systems for energy production, according to claim 1, characterized in that the longitudinal displacement relative to the ruling cables (8) is transmitted to the blades (1) with the collaboration of rods (12) joined at one end, in an articulated manner, to the tail or exit edge of the blades (1), such that the other end moves in a tubular component (11) also articulated to the separators (9), there being provided, elastic absorption devices (14) of tugging of the rods (12).

3. An eolian systems for energy production, according to claim 1, characterized in that the rod (12) may be the spindle of a hydraulic or pneumatic spring whose cylinder will be articulated to the separator (9).

4. An eolian systems for energy production, according to claim 1, characterized in that, in an alternative embodiment solution, the pulleys (4') supporting the ruling cables (8) are equipped with means for their horizontal displacement and in the direction of the prevailing winds, such that the ruling cables (8) are joined to the blades (1), by their tail or exit edge, across separators (6) similar to those of union of the blades (1) to the drag lines (2), such that displacement of the pulleys (4') over which the ruling cables (8) run, provokes a pushing of the ruling cables (8) on the separator arm (6) and the former over the tail or exit edge of the blades (1), creating a variation in the angular position thereof, with respect to the transmission belt, and consequently, with respect to the wind.

5. An eolian systems for energy production, according to claim 1, characterized in that the blade (1) ruling may be performed by combining braking of the ruling pulleys (4') and displacement thereof on the same plane.

6. An eolian systems for energy production, comprising: blades (1) fastened across an orientation axis (25), which runs parallel to the blade span and is located in the point in which the turning moment is zero for the angle of attack or maximum push, over whose axis (25) the blade (1) rotates freely to adopt the mentioned angle spontaneously, having foreseen that the blade (1) may be displaced with respect to the drag lines (2) overcoming the force of a spring or elastic component, as from whose moment, the angle of attack will be gradually reduced until reaching a balance between spring compression and the angle of attack which maintains stable the force the blade contributes to the cable.

7. An eolian systems for energy production, according to claim 6, wherein points of support of the blades (1) to the drag lines (2) of the installation are located in intermediate points of said blade (1), such that access thereof is made across notches (25'), cuts or the like.

8. An eolian systems for energy production, according to claim 6, wherein the freely rotating orientation axis (25) of the blades (1) is joined to a sliding part (28) which may be displaced over a guide (29), forming part of the support (26) by means of which the assembly is joined to the drag line by clamps (27), it being foreseen that the longitudinal displacement of the sliding part (28) and hence the axis (25) of the blade (1) is performed by overcoming the force of a compression spring (30), until the lever (31) interlocked with the axis (25) comes into contact with a partition wall (32), forming part of the support (26), interlocked with the line (2), at which moment the sliding of the lever (31) over the partition wall (32) provokes the drifting of the blade (1) and hence the gradual decrease of the angle of attack.

9. An eolian systems for energy production, according to claim 6, characterized in that the position of the blade (1) orientation axis (25) is established by design according to the profile and plan of the blade selected.

10. An eolian systems for energy production, according to claim 6, characterized in that the support pulley and drag line guidance consists of hoops (18), which are preferably arranged coaxially to the support column (3), rotating each hoop (18) around one or several internal wheels (19), which keep them confined, the wheels (19) being joined to the support column (3) across radial arms (20) protruding from said column, it being possible that the wheel axles (18) are mechanical transmission axles or electric energy generators.

11. An eolian systems for energy production, according to claim 6, characterized in that the hoops (18) have a throat for the passage of the line (2) and a rim (22), finished in a rolling extension (23) which makes contact with the wheel (19).

* * * * *